(12) United States Patent
Irie

(10) Patent No.: US 6,842,694 B2
(45) Date of Patent: Jan. 11, 2005

(54) CAR NAVIGATION SYSTEM (75) Inventor: Takashi Irie, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/747,954

(22) Filed: Dec. 31, 2003

(65) Prior Publication Data
US 2004/0153242 A1 Aug. 5, 2004

(30) Foreign Application Priority Data
Jan. 29, 2003 (JP) ........................................ 2003-020474

(51) Int. Cl.$^7$ ............................................... G01C 21/00
(52) U.S. Cl. ...................... 701/208; 701/207; 340/995.1
(58) Field of Search ................................. 701/208, 201, 701/207; 340/995.1, 990, 995.18

(56) References Cited

U.S. PATENT DOCUMENTS 6,415,222 B1 * 7/2002 Sato et al. .................. 701/208
2001/0056326 A1 * 12/2001 Kimura ...................... 701/208

FOREIGN PATENT DOCUMENTS

JP 11-051674 A 2/1992

* cited by examiner

Primary Examiner—Marthe Y. Marc-Coleman
(74) Attorney, Agent, or Firm—Birch, Stewart, Kolasch & Birch, LLP (57) ABSTRACT A car navigation system searches for a route from a start point to a destination, and provides guidance along the route. The car navigation system includes a trifurcate guidance section that makes a decision of considering two consecutive bifurcate guidance nodes among guidance nodes stored in a guidance node storing section as a single trifurcate guidance node, and makes a decision of a guidance direction to be provided as trifurcate guidance. The trifurcate guidance section provides the trifurcate guidance at the single trifurcate guidance node via a guidance section. The car navigation system can provide the guidance indicating a driver the way to proceed plainly, when two successive bifurcate intersections are present in a short distance.

13 Claims, 7 Drawing Sheets

○ : GUIDANCE NODE

◉ : EXTRACTED NODE

CAR NAVIGATION SYSTEM

BACKGROUND OF THE INVENTION

1. Field of the Invention

This Nonprovisional application claims priority under 35 U.S.C. § 119(a) on Patent Application No(s). 2003-20474 filed in JAPAN on Jan. 29, 2003, the entire contents of which are hereby incorporated by reference.

The present invention relates to a car navigation system for showing a driver a route to travel more plainly while driving.

2. Description of Related Art

A car navigation system provides a driver with guidance on the direction to proceed by speech or display when the vehicle approaches an intersection. However, two consecutive bifurcate intersections at a short distance, for example, can make the guidance confusing, thereby likely to mislead the driver.

To prevent such confusing guidance, the following relevant reference 1, for example, proposes a car navigation system that provides guidance easier to understand. It selects all the nodes, at which links with an attribute called an intra-intersection link join, from among the guidance nodes represented in map data, and integrates them to provide guidance considering these intersections as a single intersection.

Relevant reference 1: Japanese patent application laid-open No. 11-51674/1999, pp. 1–9.

As described above, there is such a conventional navigation system that collects all the nodes at which the links with the attribute called the intra-intersection links join, and provides guidance considering the plurality of intersections as a single intersection. In this case, as for the road data as to which the links do not have the attribute of the intra-intersection link, the foregoing technique is inapplicable. As a result, in such a case where two consecutive bifurcate intersections appear in a short distance, the driver can misunderstand the guidance, which presents a problem of misleading the traveling direction.

SUMMARY OF THE INVENTION

The present invention is implemented to solve the foregoing problem. It is therefore an object of the present invention to provide a car navigation system capable of providing guidance showing a driver the way to proceed more plainly in such a case where two successive bifurcate intersections appear within a short distance.

The car navigation system in accordance with the present invention includes a trifurcate guidance section that makes a decision of considering two consecutive bifurcate guidance nodes among guidance nodes stored in a guidance node storing section as a single trifurcate guidance node, and makes a decision of a guidance direction to be provided as trifurcate guidance. The trifurcate guidance section provides the trifurcate guidance at the single trifurcate guidance node via a guidance section. The car navigation system can provide the guidance showing a driver the way to proceed plainly, when two successive bifurcate intersections are present in a short distance.

DETAILED DESCRIPTION OF THE PREFERRED EMBODIMENTS

The invention will now be described with reference to the accompanying drawings.

Embodiment 1

Figure 1:
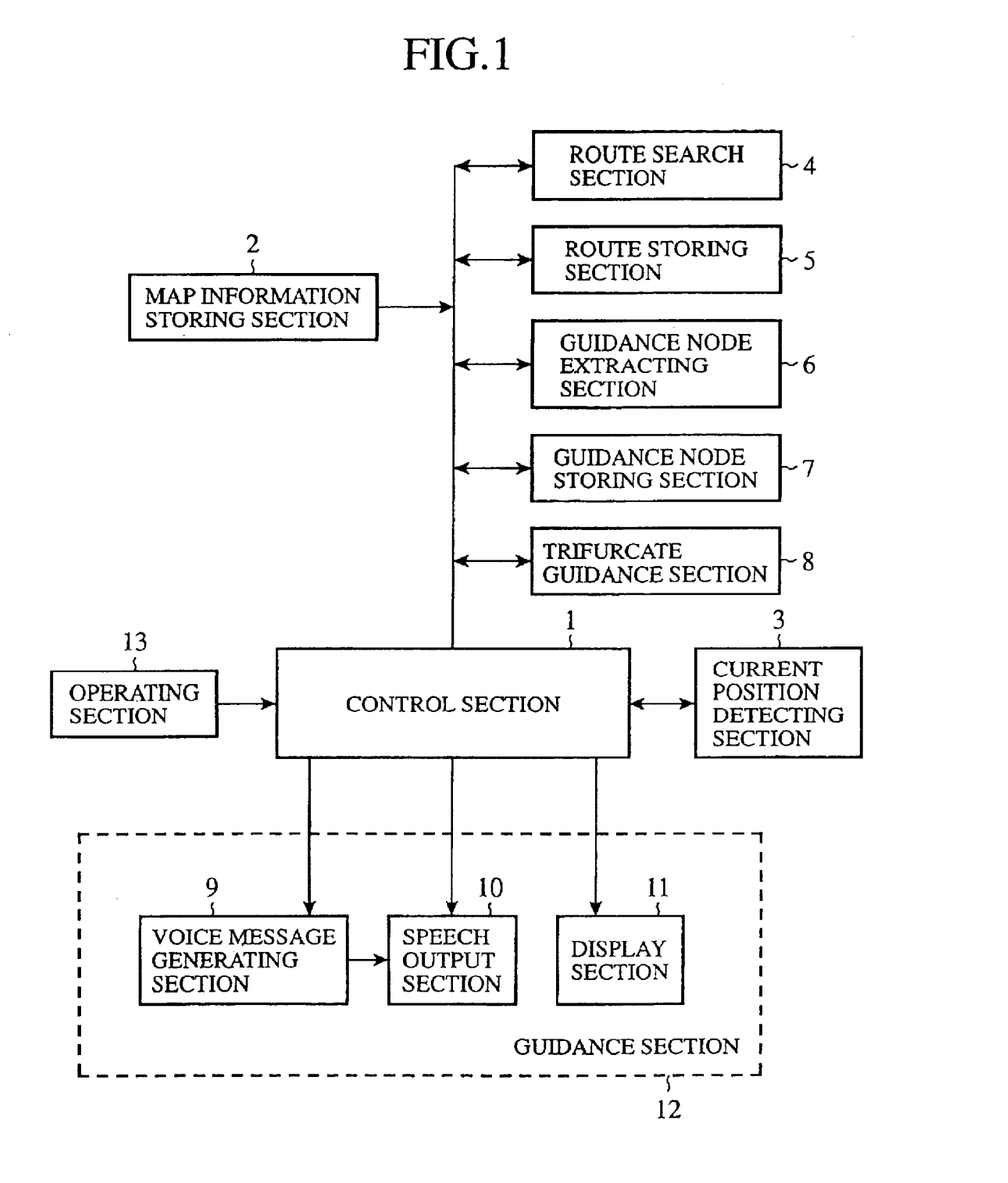
FIG. 1 is a block diagram showing a functional configuration of an embodiment 1 of the car navigation system in accordance with the present invention.

FIG. 1 is a block diagram showing a functional configuration of an embodiment 1 of the car navigation system in accordance with the present invention.

In FIG. 1, there are provided around a control section 1, a map information storing section 2; a current position detecting section 3; a route search section 4; a route storing section 5; a guidance node extracting section 6; a guidance node storing section 7; a trifurcate guidance section 8; a guidance section 12 including a voice message generating section 9, a speech output section 10 and display section 11; and an operating section 13.

The control section 1 carries out a variety of calculations and control of the entire system in the car navigation system.

The map information storing section 2 stores digital map data such as link data and node data.

The current position detecting section 3 detects the current position of the vehicle conveying the navigation system.

The route search section 4 determines a route between two spots from a current position to a destination based on the map data stored in the map information storing section 2.

The route storing section 5 stores the route determined by the route search section 4.

The guidance node extracting section 6 extracts positions requiring guidance on a route stored in the route storing section 5.

The guidance node storing section 7 stores the information on guidance nodes extracted by the guidance node extracting section 6.

As for the guidance nodes stored in the guidance node storing section 7, the trifurcate guidance section 8 makes a decision as to whether they require trifurcate guidance, and decides the guidance direction when the trifurcate guidance is necessary.

The voice message generating section 9 includes a speech information storing section that stores words and phrases required for generating voice guidance messages in terms of speech wave data, and generates voice guidance messages by selecting and combining the speech wave data corresponding to the words and phrases constituting the guidance messages at the speech guidance.

The speech output section 10 supplies a user with the guidance message produced by the voice message generating section 9.

The display section 11 displays the map stored in the map information storing section 2, the route stored by the route storing section 5, and an enlarged map around the guidance node when the vehicle approaches the guidance node stored in the guidance node storing section 7.

The operating section 13 includes switches for the user (driver) to input data such as a destination, and manages the data supplied from the switches.

Figure 2:
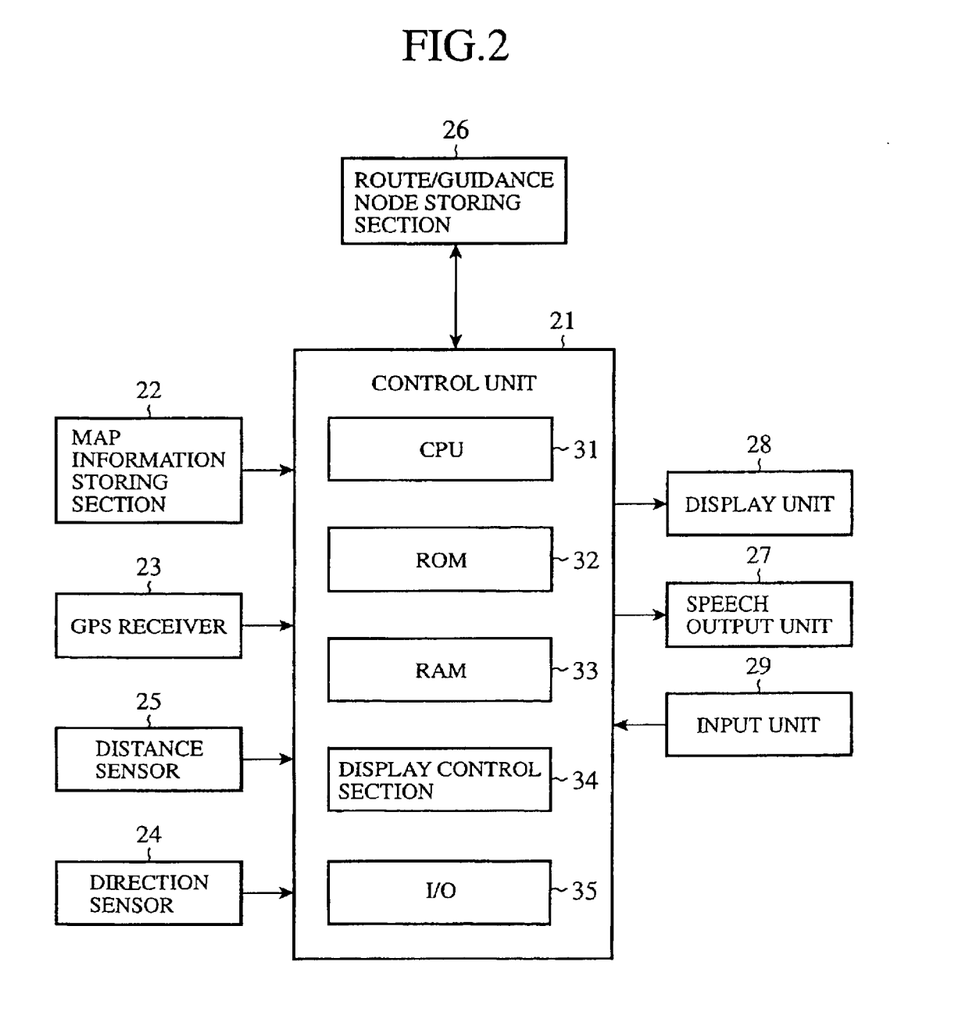
FIG. 2 is a block diagram showing a hardware configuration of the embodiment 1 of the car navigation system in accordance with the present invention.

FIG. 2 is a block diagram showing a hardware configuration for achieving the function of the configuration of FIG. 1.

In FIG. 2, the navigation system includes around a control unit 21, a map information storing unit 22, a GPS (global positioning system) receiver 23, a direction sensor 24, a distance sensor 25, a route/guidance node storing unit 26, a speech output unit 27, a display unit 28, and an input unit 29.

The control unit 21, which corresponds to the control section 1 of FIG. 1, carries out the control of the entire navigation system and a variety of calculations.

The map information storing unit 22, which corresponds to the map information storing section 2 of FIG. 1, consists of a DVD ROM (digital versatile disk read-only memory) for storing the map data in the form of digital data.

The GPS receiver 23 detects the current position of the vehicle conveying the navigation system using satellites.

The direction sensor 24 detects the direction of the vehicle.

The distance sensor 25 detects the distance traveled by the vehicle.

The GPS receiver 23, direction sensor 24 and distance sensor 25 correspond to the current position detecting section 3 of FIG. 1.

The route/guidance node storing unit 26, which corresponds to the route storing section 5 and guidance node storing section 7 of FIG. 1, stores the established route and guidance node information extracted.

The speech output unit 27, which corresponds to the speech output section 10 of FIG. 1, outputs speech such as guidance messages.

The display unit 28, which corresponds to the display section 11 of FIG. 1, consists of a liquid crystal display or the like, and displays information such as the map information, route, and guidance.

The input unit 29, which corresponds to the operating section 13 of FIG. 1, is used by the user for inputting a signal for operating the navigation system.

The control unit 21 comprises a CPU (central processing unit) 31, ROM (read-only memory) 32, RAM (random access memory) 33, display control section 34, and I/O (input/output unit) 35.

The CPU 31 carries out calculations for the route search and guidance node extraction.

The ROM 32 stores programs and constants used in the operation of the CPU 31. More specifically, it stores a main program that searches for a route from the current position to the destination, and carries out the navigation such as guidance along the route searched. In addition, it stores a program for making a decision whether to provide the trifurcate guidance, and a decision of the guidance direction at the trifurcate guidance node, which are the subject matter of the present invention.

The ROM 32 can be replaced by an external storing medium such as a CD-ROM independent of the control unit 21.

The RAM 33 is used for developing programs or map data, and for storing calculation results during the processing of the CPU 31.

The display control section 34 controls the display on the display unit 28.

The I/O 35 serves as an interface between the control unit 21 and a variety of external units 22–28.

The functions of the route search section 4, guidance node extracting section 6, trifurcate guidance section 8 and voice message generating section 9 of FIG. 1 are implemented by the processing of the control unit 21.

Next, the basic operation of the entire system will be described with reference to FIG. 1.

Before starting the vehicle, a driver manipulates the operating section 13 to input necessary data such as a destination.

The current position detecting section 3 detects the current position of the vehicle.

The map information storing section 2 stores the map data. According to the map data, the route search section 4 searches for the route from the current position detected to the destination input, thereby establishing the route between the two points. The route storing section 5 stores the route.

The guidance node extracting section 6 extracts the nodes (guidance nodes) that require the guidance on the route stored in the route storing section 5. The guidance node storing section 7 stores the information on the guidance nodes extracted.

As to the guidance nodes stored in the guidance node storing section 7, the trifurcate guidance section 8 makes a decision whether to provide the trifurcate guidance, and a decision as to the guidance direction at the trifurcate guidance, which will be described below. When the decision is made that the trifurcate guidance is to be performed, the fact is added to the guidance node storing section 7.

The display section 11 displays the map stored in the map information storing section 2, the route stored in the route storing section 5, at least one of the guidance nodes stored in the guidance node storing section 7, and the enlarged map near the guidance node.

At the guidance node, the voice message generating section 9 generates a specified voice guidance message, and the speech output section 10 outputs it to the driver.

The foregoing control of the entire operation is carried out by the control section 1.

Next, the decision processing by the trifurcate guidance section 8 will be described with reference to FIG. 3.

Figure 3:
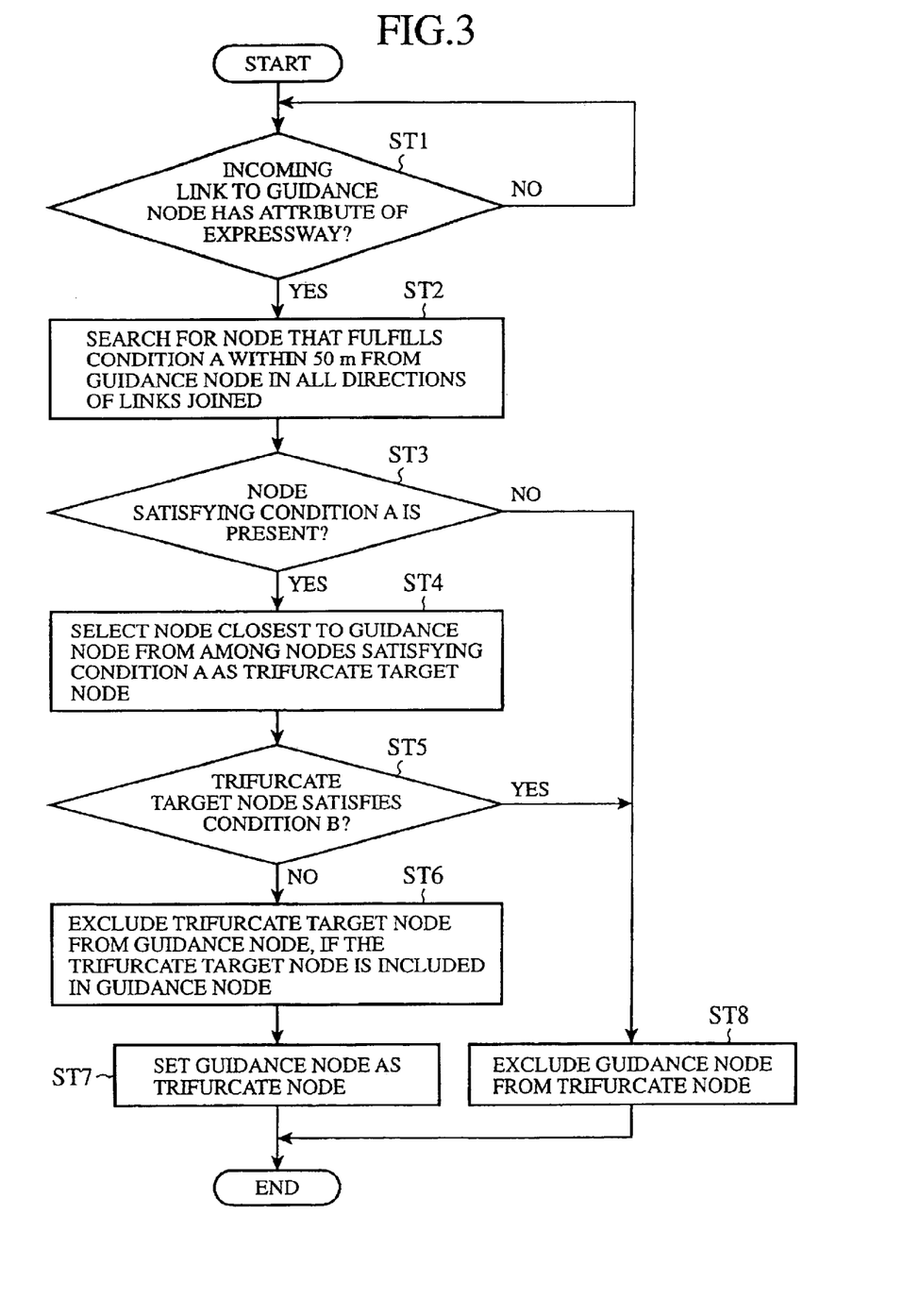
FIG. 3 is a flowchart illustrating a procedure of making a decision as to whether to execute trifurcate guidance by a trifurcate guidance section in the embodiment 1 of the car navigation system in accordance with the present invention.

FIG. 3 is a flowchart illustrating an example of the processing in accordance with the present invention. It illustrates a procedure for making a decision whether to provide the trifurcate guidance by the trifurcate guidance section 8 or not for the individual guidance nodes stored in the guidance node storing section 7.

At step ST1, the trifurcate guidance section 8 makes a decision for each guidance node stored in the guidance node storing section 7 as to whether a link flowing into the guidance node has an attribute of expressway. It is assumed here that the trifurcate guidance section 8 makes a decision only as to whether the attribute of the incoming link is the expressway or not at step ST1.

Unless the attribute of the incoming link to the guidance node is the expressway, the trifurcate guidance section 8 eliminates the guidance node from the object of the trifurcate guidance, and returns to a decision standby state. The trifurcate guidance section 8 proceeds to step ST2 only when the attribute of the incoming link is the expressway.

At step ST2, the trifurcate guidance section 8 searches for a node satisfying the following condition A within 50 m from the guidance node, for example, in all the directions of the links (including out-of-route links) joined to the guidance node, and proceeds to step ST3. The trifurcate guidance section 8 uses the distance between the intersections as the condition at step ST2.

The condition A: at least three links are joined to the guidance node; and at least two links are present within an area from +90 degrees to −90 degrees with respect to the direction of the incoming link from the start point side. The latter condition uses the junction angle of the road joined to the intersection.

At step ST3, the trifurcate guidance section 8 makes a decision as to whether the node meeting the condition of step ST2 is present or not. If it is present, the processing proceeds to step ST4, and if it is not present, the processing proceeds to step ST8. The term "present" here includes an intersection unsatisfying the guidance condition.

At step ST4, the trifurcate guidance section 8 adopts the node closest to the guidance node among the nodes searched at step ST2 as a trifurcate target node, and sets the pair of the trifurcate target node and the guidance node as a candidate of a trifurcate guidance node. The object of the step is to select one of the successive intersections as the trifurcate guidance node to provide guidance.

Figure 5A:
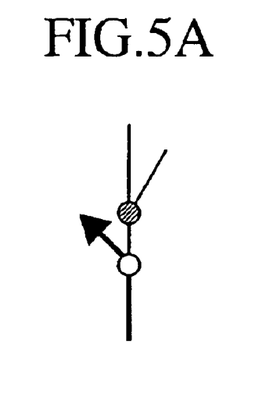
FIGS. 5A, 5B and 5C are diagrams illustrating a decision processing of a trifurcate guidance node in the car navigation system of the embodiment 1 in accordance with the present invention.
Figure 5B:
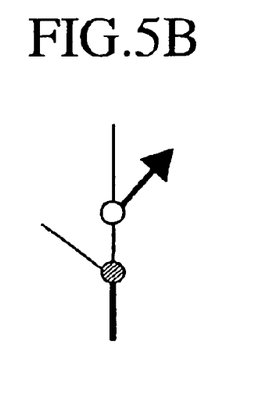
Figure 5C:
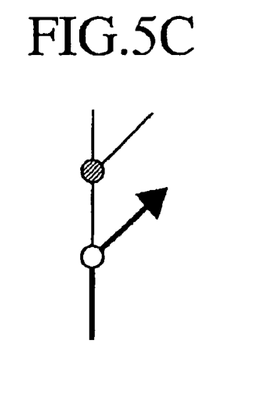

FIGS. 5(a)-5(c) show examples selected to be subjected to the trifurcate guidance at step ST4.

FIGS. 5(a)-5(c) illustrate that a bifurcate guidance node (open circle) and a bifurcate extraction node (shadowed circle) closest to the guidance node constitute a trifurcate guidance node.

At step ST5, the trifurcate guidance section 8 makes a decision as to whether the trifurcate target node selected at step ST4 satisfies the following condition B.

The condition B: at least three links are joined within an area from +90 degrees to −90 degrees with respect to the direction of the incoming link from the guidance node side; or at least one link is present whose link attribute is other than "expressway" among the links from the guidance node to the trifurcate target node.

The former of the condition B together with the latter of the condition A constitutes the condition for extracting the bifurcation intersection.

The latter of the condition B uses the road attribute of roads between the intersections as the condition. In this case, a decision is made as to whether it is "expressway" or not only.

If the condition B is satisfied, the processing proceeds to step ST8 which removes the guidance node from the object of the trifurcate guidance. In contrast, unless the condition B is satisfied, the processing proceeds to step ST6.

At step ST6, if the trifurcate target node is included in the guidance nodes extracted by the guidance node extracting section 6, the trifurcate guidance section 8 excludes the trifurcate target node from the guidance node data stored in the guidance node storing section 7 to prevent duplicate guidance.

At step ST7, the trifurcate guidance section 8 adds information that the guidance node is set as a trifurcate guidance node to the guidance node storing section 7.

The foregoing is the processing for making a decision as to whether to provide the trifurcate guidance.

Although the attribute of the incoming link is limited to the expressway at step ST1, this is not essential. For example, an ordinary road can be used as an object. In addition, a variety of conditions can be added such as other types of roads, the width of a road, the number of lanes, the traveling speed, the traffic classification, and the road geometry such as divided/undivided.

In addition, although the node is searched for in the area within 50 m at step ST2, it can be changed to any distance.

Furthermore, as for the condition A, one or more conditions of the link attributes can be added such as the type, the width of a road, the number of lanes, the traveling speed, the traffic classification, the road geometry such as divided/undivided); or the condition of the junction angle of the roads can be changed. The former refers to the road attributes of the roads joined to each of the two bifurcate intersections of interest, and the latter means that the area is not limited to the foregoing ±90 degrees.

Moreover, although the condition B at step ST5 defines the link attribute from the guidance node to the trifurcate target node as the "expressway", it may be an ordinary road. A variety of other conditions can be added such as other types of roads, the width of a road, the number of lanes, the traveling speed, the traffic classification, and the road geometry such as divided/undivided.

Next, a decision processing will be described of the guidance direction of the guidance node decided as the trifurcate guidance node as described above.

Figure 4:
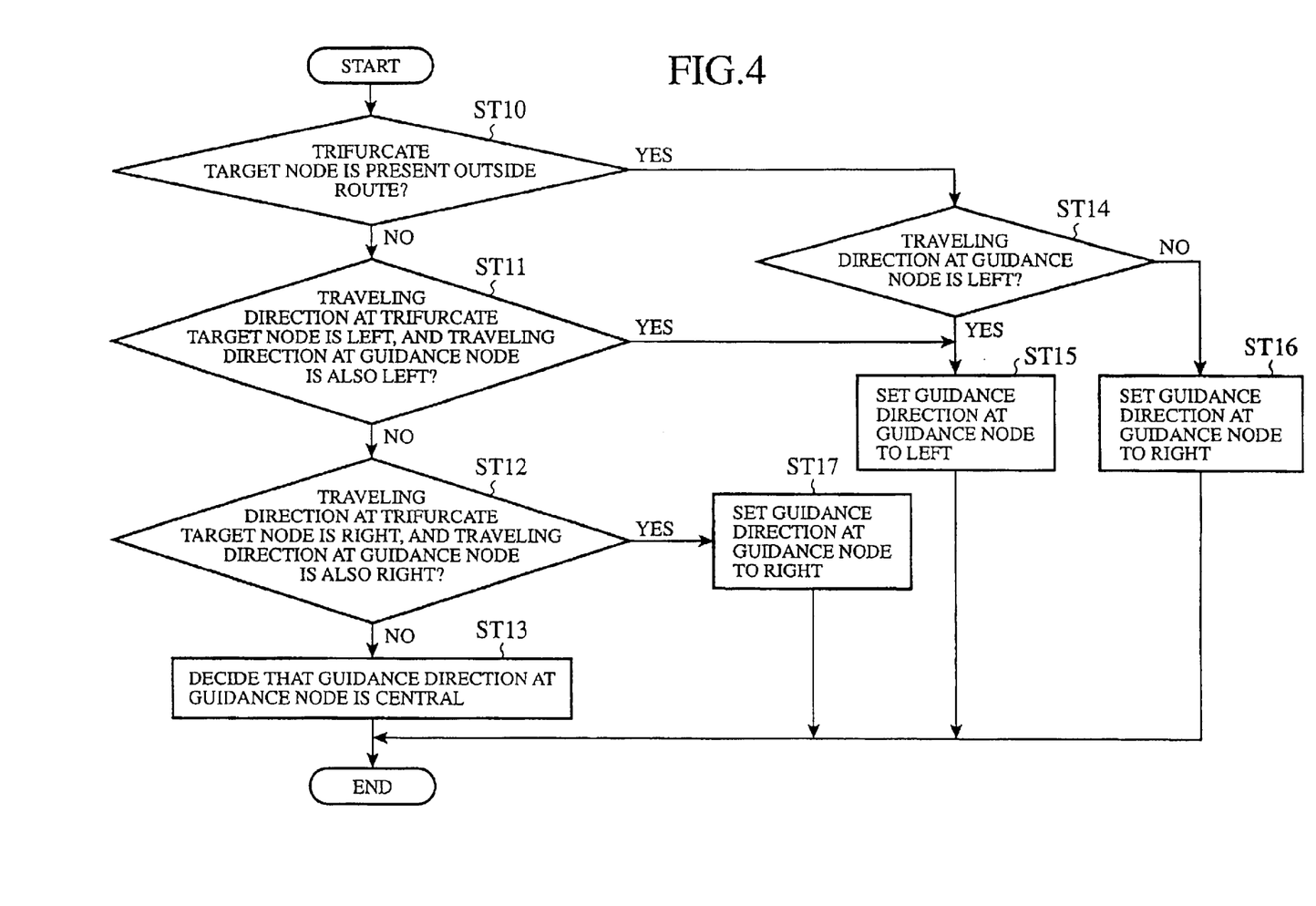
FIG. 4 is a flowchart illustrating a procedure of making a decision of a guidance direction by the trifurcate guidance section in the embodiment 1 of the car navigation system in accordance with the present invention.

FIG. 4 is a flowchart illustrating a procedure of the decision processing of the trifurcate guidance section 8 for determining the guidance direction at the trifurcate guidance node that is selected by the trifurcate guidance section 8.

At step ST10, the trifurcate guidance section 8 makes a decision as to whether the trifurcate target node is present outside the route or not. As illustrated in FIGS. 5(a) and 5(c), if the trifurcate target node, that is, the extraction node (shadowed circle) is present outside the route (bold arrow) associated with the guidance node (open circle), the processing proceeds to step ST14. In contrast, if the extraction node is present on the route associated with the guidance node as illustrated in FIG. 5(b), the processing proceeds to step ST1.

At step ST14, the trifurcate guidance section 8 makes a decision as to whether the traveling direction at the guidance node is right or left direction in accordance with the following traveling direction decision condition.

Figure 6:
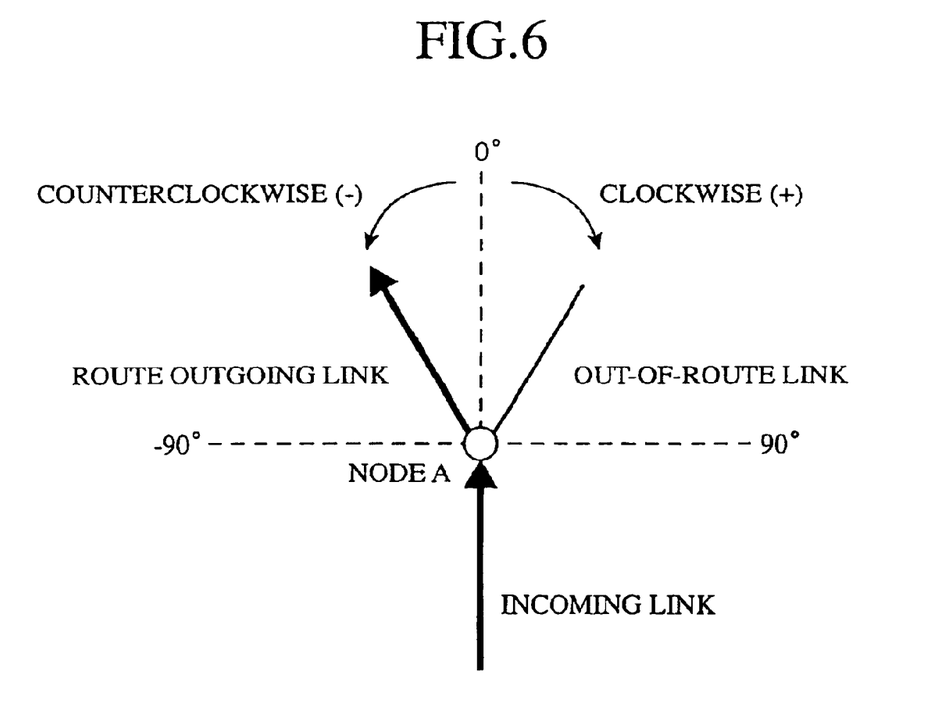
FIG. 6 is a diagram illustrating a guidance direction decision processing at a trifurcate guidance node in the car navigation system of the embodiment 1 in accordance with the present invention.

The traveling direction decision condition: if a route outgoing link and an out-of-route link are present separately in a clockwise area (0–90 degrees) and counterclockwise (−90–0 degree) area with respect to the incoming direction, the area including the route outgoing link is adopted as a guidance direction. FIG. 6 shows such an example, in which the traveling direction at the node A is the left direction.

Figure 7:
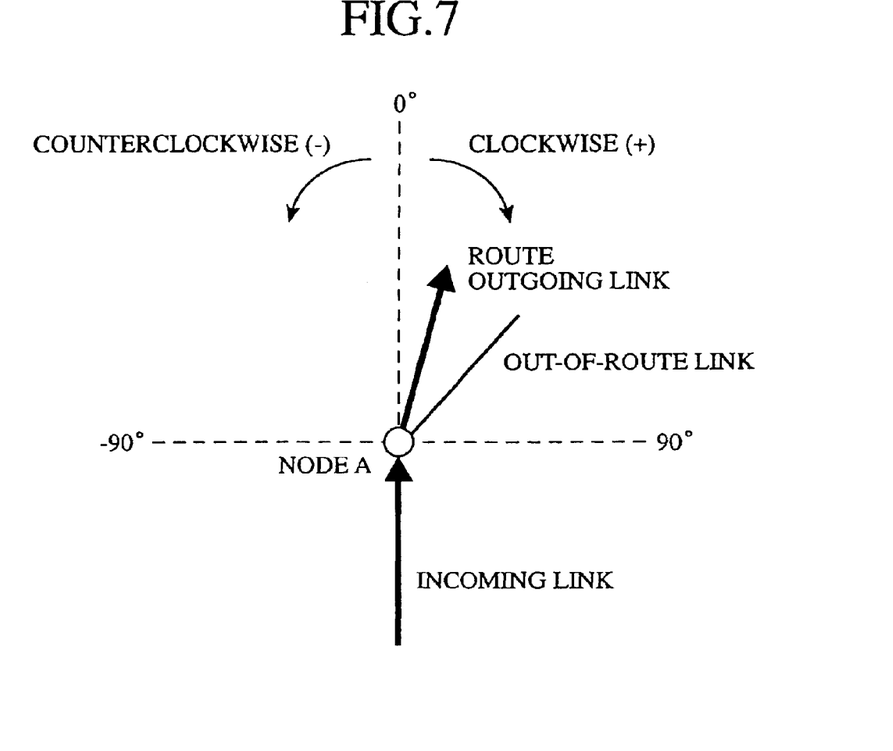
FIG. 7 is a diagram illustrating another guidance direction decision processing at the trifurcate guidance node in the car navigation system of the embodiment 1 in accordance with the present invention.

If both the links are present in one of the two areas, the trifurcate guidance section 8 decides the direction of the route outgoing link with respect to the out-of-route link, thereby adopting it as the guidance direction. FIG. 7 shows of such an example, in which the traveling direction at the node A is the left direction.

As a result of the decision, if the traveling direction is the left direction, the processing proceeds to step ST15. Otherwise, that is, if the traveling direction is the right direction the processing proceeds to step ST16.

At step ST15, the trifurcate guidance section 8 sets the guidance direction at the guidance node to the left direction, and at step ST16, it sets the guidance direction at the guidance node to the right direction.

At steps ST11–ST13, the trifurcate guidance section 8 decides the guidance direction at the guidance node from the relationship between the traveling direction at the guidance node and the traveling direction at the trifurcate target node.

The trifurcate guidance section 8 decides the traveling direction of the guidance node and the traveling direction of the trifurcate target node according to the traveling direction decision condition mentioned at step ST14.

At step ST11, the trifurcate guidance section 8 makes a decision as to whether the condition "the traveling direction of the trifurcate target node is the left direction, and the traveling direction of the guidance node is also the left direction" is satisfied or not. If the condition is satisfied, the processing proceeds to step ST15 to set the guidance direction at the guidance node to the left direction.

Otherwise, the processing proceeds to step ST12.

At step ST12, the trifurcate guidance section 8 makes a decision as to whether the condition "the traveling direction of the trifurcate target node is the right direction, and the traveling direction of the guidance node is also the right direction" is satisfied or not. If the condition is satisfied, the processing proceeds to step ST17 to set the guidance direction at the guidance node to the right direction.

Otherwise, the processing proceeds to step ST13 to set the traveling direction at the guidance node to the central direction.

The above is the decision processing of the guidance direction at the guidance node.

As for the guidance node specified as the trifurcate guidance node by the processing of steps ST1–ST8 and steps ST10–ST17, the voice message generating section 9 generates a voice message according to the guidance direction such as "Proceed to left direction (or right direction or central direction) at the trifurcate point 1 km ahead". Thus, the speech output section 10 outputs the speech at appropriate guidance timing with reference to the node closer to the start point among the guidance node and the trifurcate target node.

It is also possible to provide the voice message generating section 9 with the function to generate a voice message informing that the trifurcate target node consists of consecutive intersections.

Figure 8:
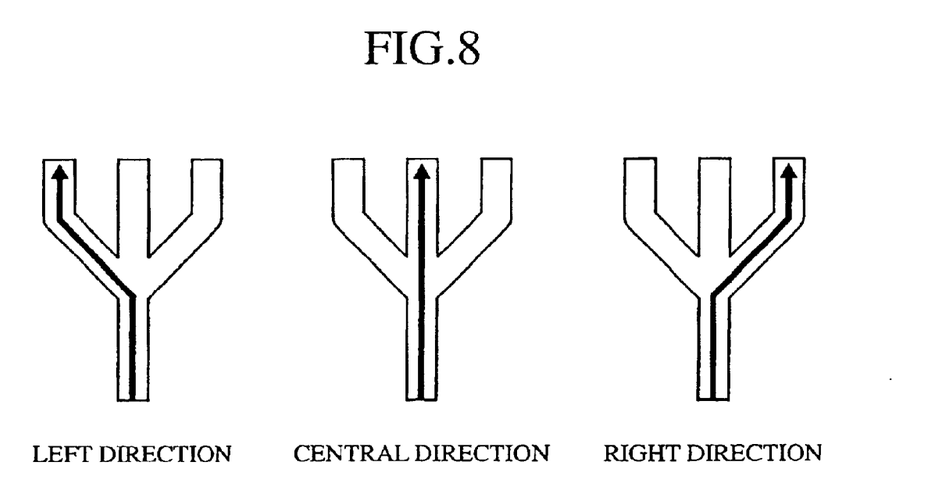
FIG. 8 is a diagram illustrating display examples of the trifurcate guidance in the embodiment 1 of the car navigation system in accordance with the present invention.

Furthermore, according to the guidance direction, the display section 11 can display an information map indicating the direction such as the left direction, central direction or right direction as illustrated in FIG. 8.

Figure 9:
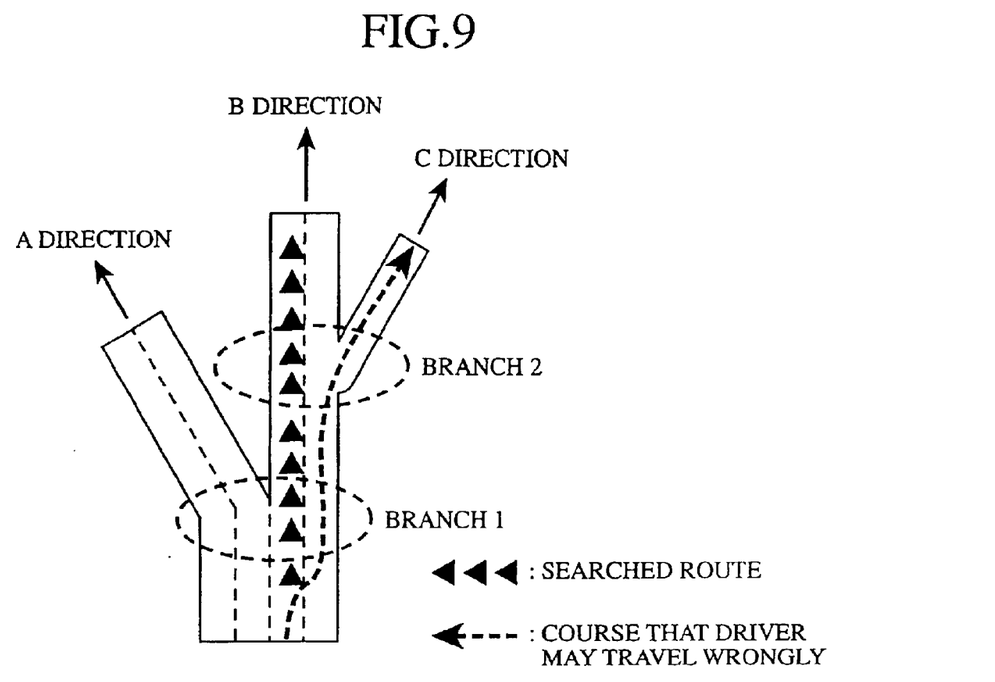
FIG. 9 is a diagram illustrating an effect of the trifurcate guidance in the embodiment 1 of the car navigation system in accordance with the present invention.

As described above, the present embodiment 1 can prevent the car navigation system from misleading the user. For example, consider the road as shown in FIG. 9 where a bifurcation 2 immediately follows a bifurcation 1 and the route is in the B direction. The conventional car navigation system, which handles the bifurcation 1 as the guidance node regardless of the next bifurcation 2, gives the speech guidance "Right direction" at the bifurcation 1. Accordingly, the driver can mistake the bifurcation 2 for the bifurcation 1 and proceed to the right direction, thereby wrongly proceeding to the C direction. In contrast with this, since the present car navigation system gives the speech guidance such as "Proceed to the central direction at the trifurcate point", it can prevent such a mistake.

Figure 10:
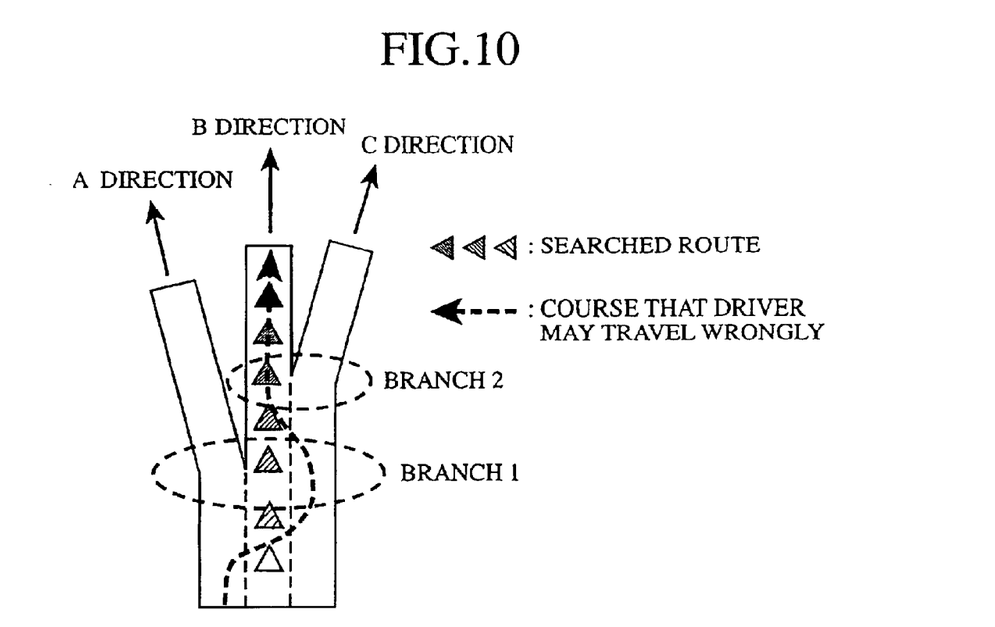
FIG. 10 is a diagram illustrating another effect of the trifurcate guidance in the embodiment 1 of the car navigation system in accordance with the present invention.

As for the road as shown in FIG. 10 where the branches 1 and 2 are both guidance nodes, the conventional system gives such a series of guidance as "Proceed to the right direction, first. Then, proceed to the left direction". Accordingly, the driver can change the lane unnecessarily. The present system can eliminate such an unnecessary lane change because it gives the speech guidance such as "Proceed to the central direction at the trifurcate point".

Furthermore, as for the foregoing case of FIG. 10, since the conventional system gives the consecutive guidance for the road, which appears as one trifurcate point from the driver's viewpoint, it is likely to mislead the driver. In contrast with this, the present system can prevent such confusion.

As described above, the present embodiment 1 of the car navigation system is configured such that it includes the current position detecting section 3 for detecting the current position of the vehicle; the map information storing section 2 for storing the map information; the route storing section 5 for storing the route from the current position, which is searched for and set by the map information storing section 2, to the destination; the guidance node storing section 7 for storing the guidance nodes extracted from the route stored; the guidance section 12 for providing the guidance of the route or the guidance at the guidance node; and the control section 1 for controlling the foregoing sections, and that it further comprises the trifurcate guidance section 8 which makes a decision that the consecutive bifurcate guidance nodes among the guidance nodes stored in the guidance node storing section 7 are considered to be a single trifurcate guidance node, and a decision of the guidance direction at the trifurcate guidance node, and carries out the speech guidance or display guidance by the trifurcate information map. Accordingly, the present car navigation system can provide the guidance showing the driver the way to proceed more plainly when two consecutive bifurcate intersections considered as the guidance nodes are present in a short distance.

In addition, it makes a decision of the single trifurcate guidance node using as the decision condition the road attribute between the two bifurcate intersections of interest, such as the type of the road like an expressway or ordinary road, the width of a road, the number of lanes, the traveling speed, the traffic classification, or the divided/undivided geometry of the road. Thus, it can provide the trifurcate guidance according to a variety of road conditions.

Alternatively, it makes a decision of the single trifurcate guidance node using as the decision condition the road attribute of the roads joined to each of the two bifurcate intersections of interest, such as the type of the road like an expressway or ordinary road, the width of a road, the number of lanes, the traveling speed, the traffic classification, or the divided/undivided geometry of the road. Thus, it can provide the trifurcate guidance according to a variety of road conditions. For example, if the trifurcate guidance is inappropriate depending on the road joined, the present car navigation system can avoid such a problem.

Furthermore, the present car navigation system makes a decision of the single trifurcate guidance node using the junction angle between the roads joined to each of the two bifurcate intersections as the decision condition, thereby providing the trifurcate guidance to the intersections that needs the trifurcate guidance according to the junction angle of the road. Accordingly, it can obviate the trifurcate guidance at the intersection where the trifurcate guidance is not necessary depending on the junction angle of the road. As a result, the present car navigation system can provide the guidance showing the driver the way to proceed more plainly.

In addition, the present car navigation system makes a decision of the single trifurcate guidance node using the distance between the two bifurcate intersections as the decision condition. Accordingly, it can obviate the unnecessary trifurcate guidance by preventing the next intersection faraway ahead from being considered as the object of the trifurcate guidance. Thus, it can conduct the trifurcate guidance in accordance with the road geometry, thereby being able to provide the guidance showing the driver the way to proceed more plainly.

Furthermore, the present car navigation system decides the guidance timing of the single trifurcate guidance node with reference to one of the two bifurcate intersections, which is closer to the start point. Accordingly, it can provide the trifurcate guidance at appropriate timing, thereby being able to provide the guidance showing the driver the way to proceed more plainly.

Moreover, when a plurality sets of two bifurcate intersections are present consecutively as the single trifurcate guidance nodes, the present car navigation system provides the guidance to only one of them selected as the trifurcate guidance node. Accordingly, it can eliminate the problem of increasing the likelihood of misleading the driver when the trifurcate guidance is given consecutively, thereby being able to provide the guidance showing the driver the way to proceed more plainly.

Embodiment 2

Although the foregoing embodiment 1 provides the trifurcate guidance for the two bifurcate intersections, both of which belong to the guidance nodes stored in the guidance node storing section 7, this is not essential. For example, the present embodiment 2 is configured such that it makes a decision of considering a bifurcate guidance node belonging to a guidance node and a bifurcation intersection not subjected to the guidance as a single trifurcate guidance node, and makes a decision of the guidance direction at the trifurcate guidance to provide the speech guidance or display guidance as the single trifurcate guidance node.

As described above, the present embodiment 2 can provide the guidance enabling the driver to select the direction to proceed correctly even if the bifurcation intersection constituting the guidance node and the bifurcation intersection not subjected to the guidance are consecutively present in a short distance.

What is claimed is:

1. A car navigation system comprising:
   a current position detecting section for detecting a current position of a vehicle;
   a map information storing section for storing map information;
   a route storing section for storing a route from the current position to a destination, the current position being searched for and set based on said map information storing section;
   a guidance node storing section for storing a guidance node extracted from the route stored;
   a guidance section for providing guidance of one of the route and guidance node;
   a control section for controlling said sections; and
   a trifurcate guidance section for making a decision of considering two consecutive bifurcate intersections as a single trifurcate guidance node, for making a decision of a guidance direction to be provided as trifurcate guidance, and for having said guidance section provide the trifurcate guidance as to the single trifurcate guidance node.

2. The car navigation system according to claim 1, wherein the two consecutive bifurcate intersections constituting the single trifurcate guidance node consist of two consecutive bifurcate guidance nodes among guidance nodes stored in said guidance node storing section.

3. The car navigation system according to claim 1, wherein the two consecutive bifurcate intersections constituting the single trifurcate guidance node consist of a bifurcate guidance node among guidance nodes stored in said guidance node storing section and a bifurcate intersection not subjected to guidance.

4. The car navigation system according to claim 1, wherein said guidance section provides speech guidance for the single trifurcate guidance node.

5. The car navigation system according to claim 1, wherein said guidance section conducts display guidance which provides a trifurcate information map for the single trifurcate guidance node.

6. The car navigation system according to claim 1, wherein said trifurcate guidance section makes a decision of the single trifurcate guidance node using a road attribute of a road between the two bifurcate intersections as a decision condition.

7. The car navigation system according to claim 1, wherein said trifurcate guidance section makes a decision of the single trifurcate guidance node using a road attribute of a road joined to each of the two bifurcate intersections as a decision condition.

8. The car navigation system according to claim 6, wherein the road attribute includes at least one of a road type selected from an expressway and ordinary road, a width of the road, a number of lanes, traveling speed, traffic classification, and a divided/undivided road.

9. The car navigation system according to claim 1, wherein said trifurcate guidance section makes a decision of the single trifurcate guidance node using a junction angle between roads as a decision condition, each of the roads being joined to one of the two bifurcate intersections.

10. The car navigation system according to claim 1, wherein said trifurcate guidance section makes a decision of the single trifurcate guidance node using a distance between the two bifurcate intersections as a decision condition.

11. The car navigation system according to claim 1, wherein said trifurcate guidance section makes a decision of a guidance timing as to the single trifurcate guidance node with reference to one of the two bifurcate intersections, which is closer to a start point.

12. The car navigation system according to claim 1, wherein when a plurality of sets of two consecutive bifurcate intersections to be adopted as the single trifurcate guidance node are present, said guidance section provides guidance for only one of the plurality of sets as the trifurcate guidance node.

13. The car navigation system according to claim 7, wherein the road attribute includes at least one of a road type selected from an expressway and ordinary road, a width of the road, a number of lanes, traveling speed, traffic classification, and a divided/undivided road.

* * * * *